(12) United States Patent
Iizawa (10) Patent No.: US 11,403,139 B2
(45) Date of Patent: Aug. 2, 2022

(54) INFORMATION PROCESSING DEVICE, STORAGE SYSTEM, AND NON-TRANSITORY COMPUTER-READABLE STORAGE MEDIUM FOR STORING SCHEDULING PROGRAM

(71) Applicant: FUJITSU LIMITED, Kawasaki (JP)

(72) Inventor: Ken Iizawa, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 137 days.

(21) Appl. No.: 16/924,252

(22) Filed: Jul. 9, 2020

(65) Prior Publication Data

US 2021/0034415 A1 Feb. 4, 2021

(30) Foreign Application Priority Data

Jul. 30, 2019 (JP) .............................. JP2019-139673

(51) Int. Cl.
*G06F 9/46* (2006.01)
*G06F 9/48* (2006.01)
*G06F 9/30* (2018.01)

(52) U.S. Cl.
CPC .......... *G06F 9/4881* (2013.01); *G06F 9/3009* (2013.01); *G06F 9/485* (2013.01)

(58) Field of Classification Search
CPC ....... G06F 9/4881; G06F 9/3009; G06F 9/485
See application file for complete search history.

(56) References Cited

U.S. PATENT DOCUMENTS

| 9,430,290 B1* | 8/2016 | Gupta ................. G06F 9/52 |
| 2001/0049769 A1 | 12/2001 | Ono | |
| 2011/0004881 A1* | 1/2011 | Terechko .............. G06F 9/4881 718/102 |
| 2015/0242275 A1* | 8/2015 | Hks ..................... G06F 11/14 714/10 |
| 2018/0341525 A1* | 11/2018 | Gupta ................. G06F 9/505 |

FOREIGN PATENT DOCUMENTS

| JP | H09-198249 A | 7/1997 |
| JP | 2000-187638 A | 7/2000 |
| JP | 2001-344153 A | 12/2001 |
| WO | 2016/001959 A1 | 1/2016 |

\* cited by examiner

*Primary Examiner* — Gregory A Kessler
(74) *Attorney, Agent, or Firm* — Fujitsu Patent Center (57) ABSTRACT

An information processing device includes: a plurality of threads, each of the plurality of threads being configured to process any of a plurality of tasks, the plurality of tasks being obtained by dividing a job; and a control circuit configured to execute processing when designating a next task in scheduling for the plurality of threads, the processing including inquiring of an assignment destination thread out of the plurality of threads as to whether the next task is to be completed by a scheduled time, and preferentially assigning a task supposed to be completed by the scheduled time in the assignment destination thread, as the next task from among the plurality of tasks.

6 Claims, 12 Drawing Sheets

| | | |
|---|---|---|
| AVERAGE SEEK TIME | 20 [ms] | 221 |
| AVERAGE ROTATION WAITING TIME | 5 [ms] | |
| DATA TRANSFER TIME | 100 [MB/s] | |

FIG. 7

| OID | DEADLINE |
|---|---|
| 1 | 1000 |
| 2 | 2000 |
| 3 | 2000 |

FIG. 8

| TIME | EVENT |
|---|---|
| 200 | OID1 PREFETCH START |
| 1000 | OID1 PREFETCH COMPLETION |
| 1200 | OID3 PREFETCH START |
| 2000 | OID3 PREFETCH COMPLETION |
| 2200 | OID2 PREFETCH START |
| 3000 | OID2 PREFETCH COMPLETION |

INFORMATION PROCESSING DEVICE, STORAGE SYSTEM, AND NON-TRANSITORY COMPUTER-READABLE STORAGE MEDIUM FOR STORING SCHEDULING PROGRAM

CROSS-REFERENCE TO RELATED APPLICATION

This application is based upon and claims the benefit of priority of the prior Japanese Patent Application No. 2019-139673, filed on Jul. 30, 2019, the entire contents of which are incorporated herein by reference.

FIELD

The embodiments discussed herein are related to an information processing device, a storage system, and a non-transitory computer-readable storage medium for storing a scheduling program.

BACKGROUND

In a storage system, when accessing data in an object storage device (OSD), task scheduling relating to a prefetch input/output (I/O) process is carried out. When a job is submitted by a client, an executer, which is a resource of a central processing unit (CPU) or a dynamic random access memory (DRAM) for executing the job, is assigned to the job.

Examples of the related art include Japanese Laid-open Patent Publication No. 2001-344153, Japanese Laid-open Patent Publication No. 9-198249, International Publication Pamphlet No. WO 2016/001959, and Japanese Laid-open Patent Publication No. 2000-187638.

SUMMARY

According to an aspect of the embodiments, an information processing device includes: a plurality of threads, each of the plurality of threads being configured to process any of a plurality of tasks, the plurality of tasks being obtained by dividing a job; and a control circuit configured to execute processing when designating a next task in scheduling for the plurality of threads, the processing including inquiring of an assignment destination thread out of the plurality of threads as to whether the next task is to be completed by a scheduled time, and preferentially assigning a task supposed to be completed by the scheduled time in the assignment destination thread, as the next task from among the plurality of tasks.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Since the load of the OSD differs for each partition set in a DRAM storage area, the time taken for prefetching also differs for each partition. For example, when a target OSD is already executing a prefetch request at the time when another prefetch request is issued, the prefetch request issued later is kept waiting, and accordingly the time to complete prefetching becomes longer.

This produces a task that does not complete prefetching before the task execution starts, and I/O wait occurs before the task starts processing the partition, which may increase the job execution time.

In an aspect of the present disclosure, provided is a solution to reduce the job execution time in the storage system.

Hereinafter, embodiments will be described with reference to the drawings. However, the embodiments indicated below are merely examples, and there is no intention to except the application of various modifications and technologies not explicitly stated in the embodiments. For example, the present embodiments may be variously modified and carried out without departing from the spirit of the embodiments.

Furthermore, each drawing is not construed to include only the constituent elements illustrated in the drawing, and may include other functions and the like.

Hereinafter, in the drawings, the same reference signs each indicate a similar part, and thus the description of the similar part will be omitted.

[A] Example of Embodiment

[A-1] System Configuration Example

Figure 1:
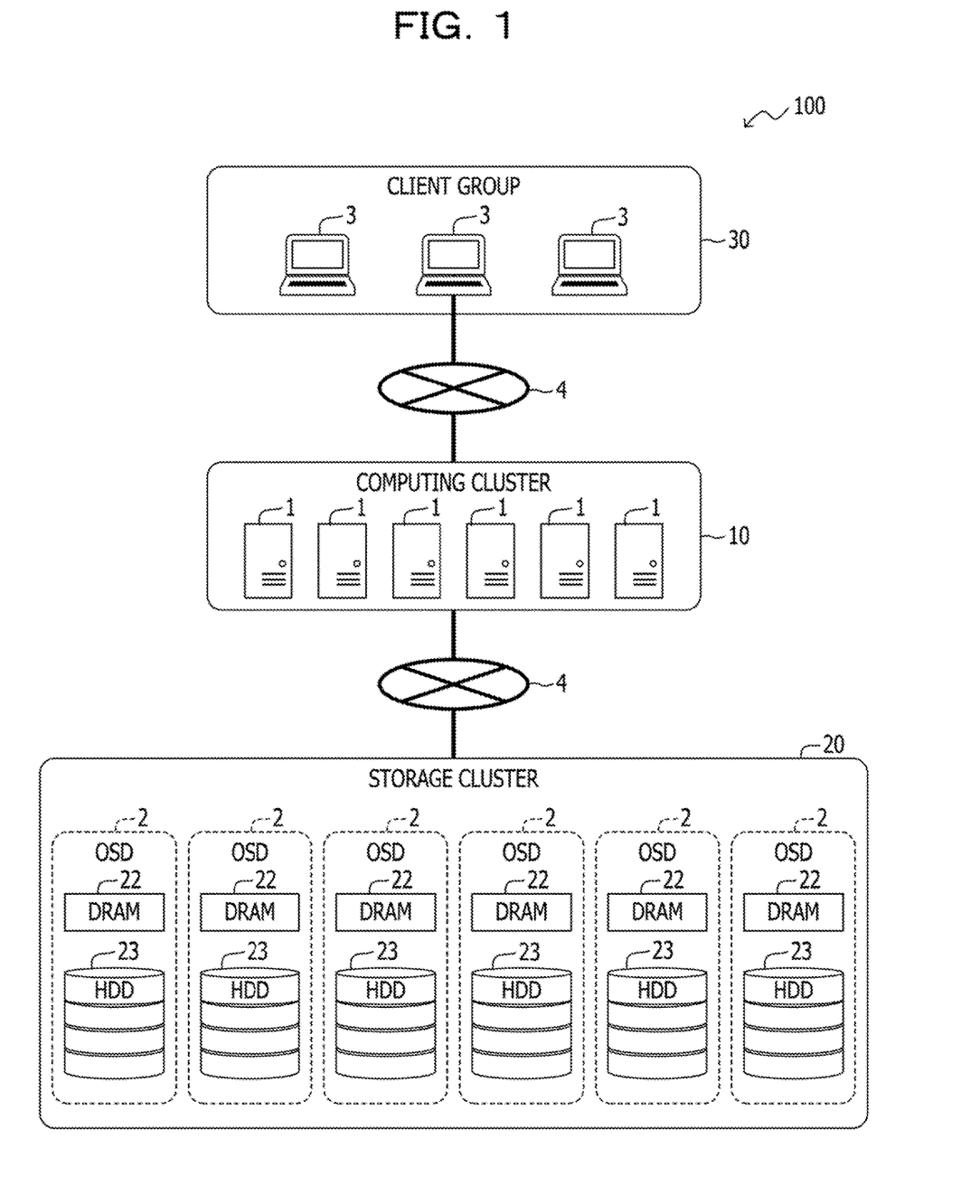
FIG. 1 is a block diagram schematically illustrating a configuration example of a storage system in an example of an embodiment.

FIG. 1 is a block diagram schematically illustrating a configuration example of a storage system 100 in an example of an embodiment.

The storage system 100 includes a computing duster 10, a storage cluster 20, and a client group 30. The computing cluster 10, the storage cluster 20, and the client group 30 are connected via a network 4. The client group 30 accesses the storage cluster 20 via the computing cluster 10.

The client group 30 includes a plurality of (three in the illustrated example) clients 3. Each client 3 makes a request to the computing cluster 10 for an access to data in the storage cluster 20.

The computing cluster 10 includes a plurality of (six in the illustrated example) information processing devices 1. Each information processing device 1 processes an access from the client group 30 to the storage cluster 20. Note that the details of the information processing device 1 will be described later with reference to FIG. 2.

The storage cluster 20 includes a plurality of (six in the illustrated example) object storage devices (OSDs) 2. Each OSD 2 includes a dynamic random access memory (DRAM) 22 and a hard disk drive (HDD) 23. Various types of control information are recorded in the DRAM 22. The HDD 23 stores target data to be accessed from the client group 30. Note that the details of the OSD 2 will be described later with reference to FIG. 3.

Figure 2:
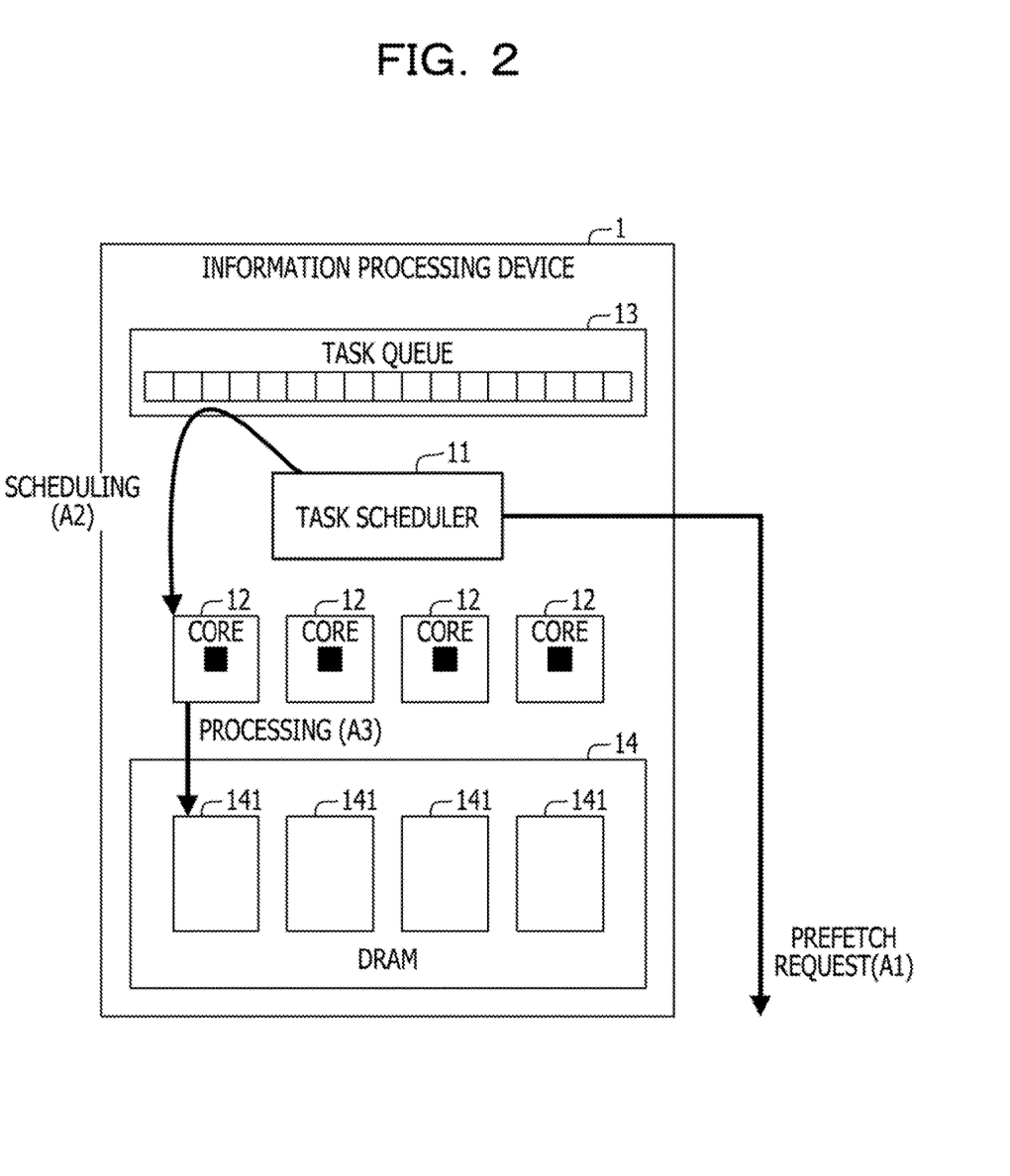
FIG. 2 is a block diagram schematically illustrating a hardware configuration example of an information processing device illustrated in FIG. 1.

FIG. 2 is a block diagram schematically illustrating a hardware configuration example of the information processing device 1 illustrated in FIG. 1.

The information processing device 1 includes a task scheduler 11, a plurality of (four in the illustrated example) cores 12 (may be referred to as "threads"), a task queue 13, and a DRAM 14.

When a job is submitted from the client group 30, the computing duster 10 assigns an executor (in other words, the information processing device 1), which is a resource of a CPU, a memory, or the like for executing the job.

The DRAM 14 has a plurality of (four in the illustrated example) partitions 141. The partition 141 is a divided data set. Each partition 141 is stored in the storage cluster 20 as an object having a unique object identifier (ID) and copied to the DRAM 14. Each task processes one partition 141. The data set is data processed by the job and is stored in the storage duster 20.

An unexecuted task is registered in the task queue 13. A task is an execution unit obtained by dividing a job and allowed to be executed in parallel.

The task scheduler 11 is an example of an assignment unit, and is a component that assigns a task to the core 12 of the CPU. Furthermore, the task scheduler 11 issues, to the storage cluster 20, a prefetch request for the partitions 141 processed by d tasks in the task queue 13 (see reference sign A1).

Here, d denotes prefetching depth (in other words, the number of prefetch requests simultaneously issued by the task scheduler 11), and is a natural number. As illustrated in FIG. 2, d may be equal to k, which is the number of cores 12 assigned to the executor.

Upon receiving the prefetch request from the information processing device 1, the storage duster 20 copies the data set from the HDD 23 to the partition 141 of the specified DRAM 14.

The task scheduler 11 assigns a new task to the core 12 in accordance with a scheduling result (see reference sign A2). Then, the task performs the process of reading the processing target partition 141 from the storage cluster 20 and writing the read partition 141 in the DRAM 14 (see reference sign A3). The read partition 141 is deleted from the DRAM 22 of the OSD 2.

In other words, the plurality of cores 12 processes a plurality of tasks related to a set of jobs. When designating the next task in the scheduling for the plurality of cores 12, the task scheduler 11 inquires of an assignment destination core 12 out of the plurality of cores 12 as to whether the next task is to be completed by the scheduled time. Then, the task scheduler 11 preferentially assigns a task supposed to be completed by the scheduled time in the assignment destination core 12, as the next task from among the plurality of tasks.

Furthermore, the task scheduler 11 performs prefetching for the next task on an OSD 2 in which data related to the next task is recorded, before assigning the next task.

Moreover, the task scheduler 11 assigns the next task when the prefetching for the next task is to be completed by the scheduled time.

Note that the assignment of a task regarding the job other than prefetching may be made.

Figure 3:
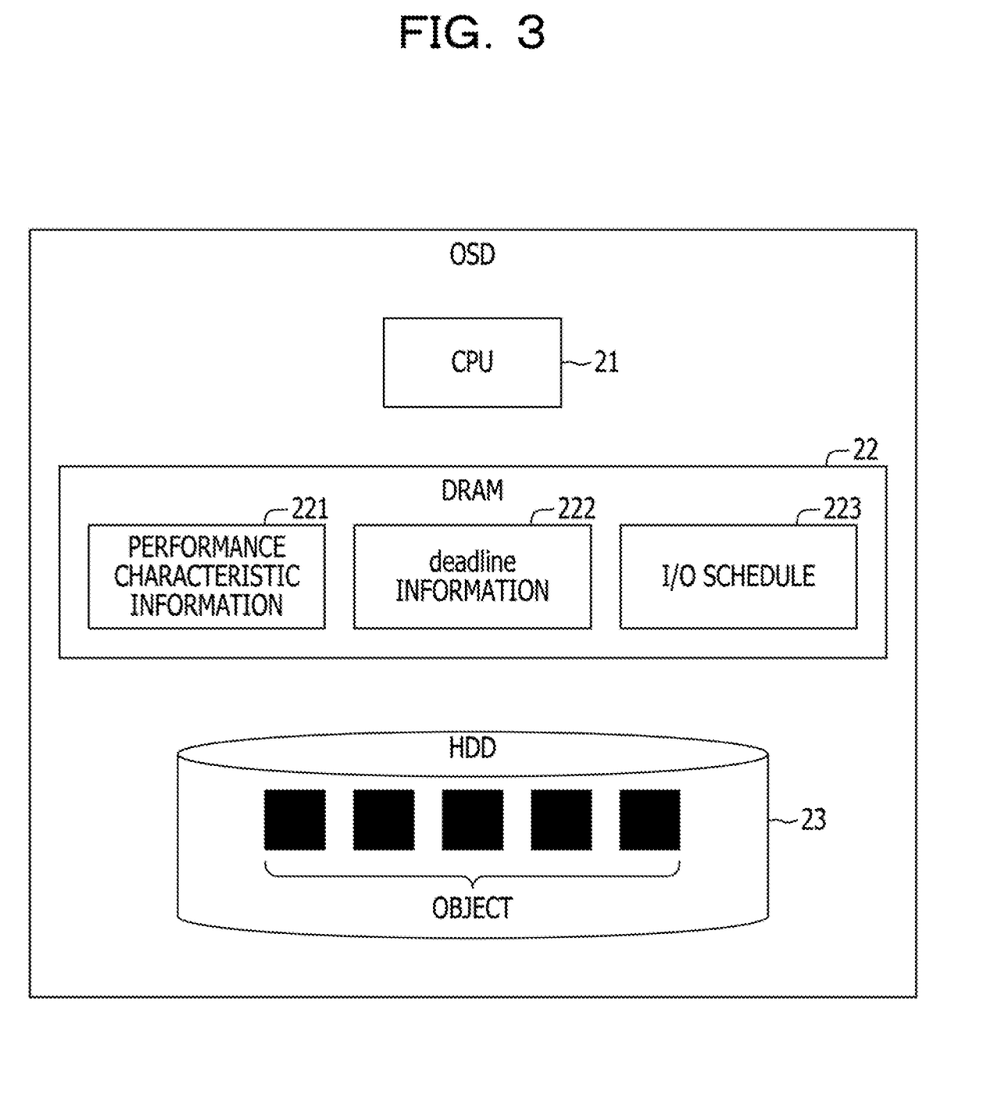
FIG. 3 is a block diagram schematically illustrating a hardware configuration example of an OSD illustrated in FIG. 1.

FIG. 3 is a block diagram schematically illustrating a hardware configuration example of the OSD 2 illustrated in FIG. 1.

The OSD 2 is an example of a storage device and includes a CPU 21, a DRAM 22, and an HOD 23.

The HDD 23 stores a plurality of objects.

The DRAM 22 stores performance characteristic information 221, deadline information 222, and an input/output (I/O) schedule 223. The performance characteristic information 221 indicates the performance characteristics of the HOD 23. The deadline information 222 indicates the relationship between an object for which prefetching has not been completed, among objects specified by reserve, and the deadline of the object. The I/O schedule 223 is a time series in which object is to be prefetched at which timing is represented by one time series. The performance characteristic information 221, the deadline information 222, and the I/O schedule 223 will be each described later with reference to FIGS. 6 to 8.

The CPU 21 is illustratively a processing device that performs various controls and calculations, and implements various functions by executing an operating system (OS) and programs stored in the DRAM 22.

Note that programs for implementing various functions may be provided in a form recorded on a computer-readable recording medium such as a flexible disk, a compact disc (CD) (for example, a CD-read only memory (ROM), a CD-recordable (R), and CD-rewritable (RW)), a digital versatile disk (DVD) (for example, a DVD-ROM, a DVD-RAM, a DVD-R, a DVD+R, a DVD-RW, a DVD+RW, and an HD DVD), a Blu-ray disc, a magnetic disk, an optical disc, and a magneto-optical disk, for example. Then, a computer (the CPU 21 in the present embodiment) may read the programs from the above-described recording medium via a reading device (not illustrated), and transfer the read programs to an internal recording device or an external recording device to store and use. Alternatively, the programs may be recorded in a storage device (recording medium) such as a magnetic disk, an optical disc, or a magneto-optical disk, for example, and provided from the storage device to a computer via a communication path.

When various functions are implemented, the programs stored in an internal storage device (the DRAM 22 in the present embodiment) can be executed by the computer (the CPU 21 in the present embodiment).

Furthermore, the computer may read and execute the programs recorded in the recording medium.

Illustratively, the CPU 21 controls the entire operation of the OSD 2. The device for controlling the entire operation of the OSD 2 is not limited to the CPU 21, and may be any one of an MPU, a DSP, an ASIC, a PLD, and an FPGA, for example. Furthermore, the device for controlling the entire operation of the OSD 2 may be a combination of two or more types of the CPU, the MPU, the DSP, the ASIC, the PLD and the FPGA. Note that the MPU is an abbreviation for the micro processing unit, the DSP is an abbreviation for the digital signal processor, and the ASIC is an abbreviation for the application specific integrated circuit. In addition, the PLD is an abbreviation for the programmable logic device, and the FPGA is an abbreviation for the field programmable gate array.

The OSD 2 has application programming interfaces (APIs) for reserve and cancel.

The input of reserve is an object ID and a deadline. The output of reserve is OK, NG, the earliest completion time, or EAGAIN.

This reserve makes a response as to whether prefetching of the specified object is to be completed by the specified time (in other words, the deadline). When prefetching is to be completed, OK is sent as a response, and when the prefetching is not to be completed, NG and the earliest completion time (in other words, the earliest time by which prefetching can be completed) are sent as a response. Furthermore, from the time when reserve is called for a certain object until the time when cancel is called for the corresponding object, all reserves for the concerned OSD 2 fail with EAGAIN.

The input of cancel is the object ID and there is no output.

This cancel cancels the effect of reserve for the specified object. After canceling the effect of reserve, reserve for the corresponding OSD 2 will be allowed to succeed.

In addition, before the prefetch request is sent, reserve is precedently issued for the object. When no reserve is issued, prefetching will fail. Prefetching of the object is guaranteed to be completed by the deadline specified in preceding reserve. Similar to cancel, the effect of preceding reserve disappears at the time point when the OSD 2 receives the prefetch request, and reserve for the OSD 2 will be allowed to succeed.

These reserve and cancel are implemented by, for example, the performance characteristic information 221, the deadline information 222, and the I/O schedule 223 stored in the DRAM 22 of the OSD 2.

Figure 4:
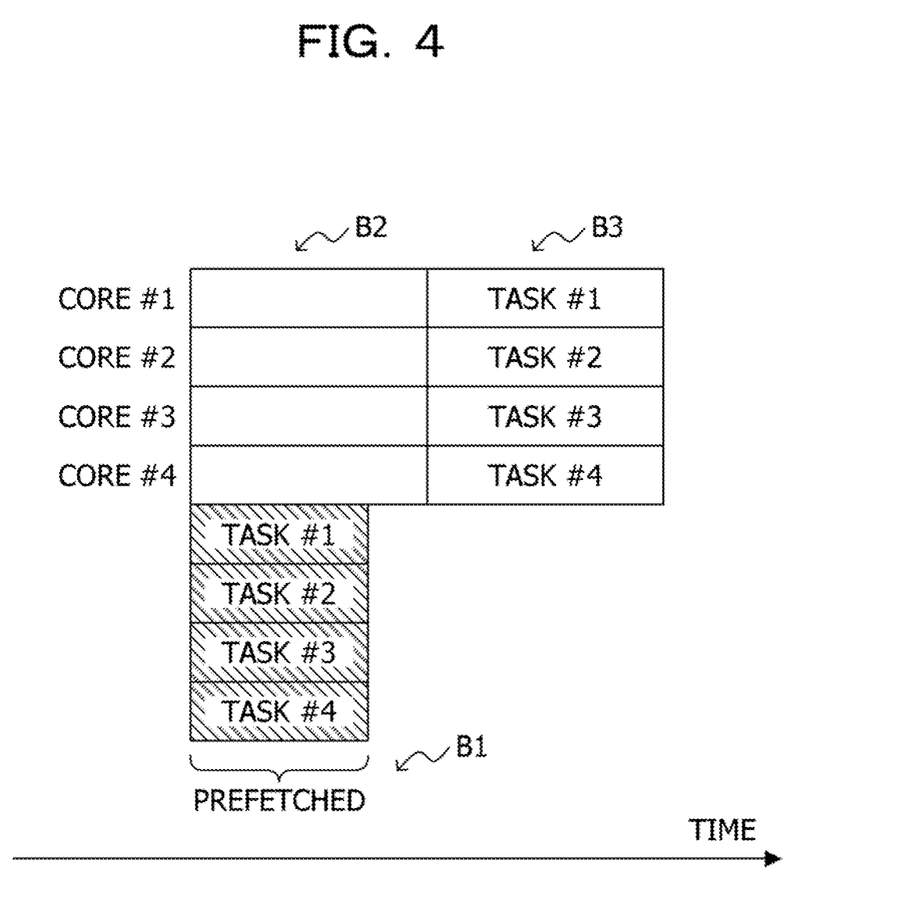
FIG. 4 is a graph illustrating a first example of a time series of task execution and prefetching in a related example.

FIG. 4 is a graph illustrating a first example of a time series of task execution and prefetching in a related example.

A prefetch request is issued for d (=k=4) tasks #1 to #4 from the top of the task queue (see reference sign B1). At the same time, those tasks are assigned to the cores (see reference sign B2). These tasks request partitions from the storage duster, and the process is started as soon as the reading is completed (see reference sign B3). Read access to a partition for which prefetching has not been completed is delayed until prefetching is completed.

Once a certain task is completed, the task scheduler assigns the next task to the freed core. When prefetching of a partition to be processed by the task is completed, the task can immediately copy the partition to the executor's DRAM and start a data process.

Furthermore, at the same time when the task starts a data process, prefetch for the next task in the task queue is issued. The task can be selected according to a predetermined scheduling policy such as first in first out (FIFO).

Figure 5:
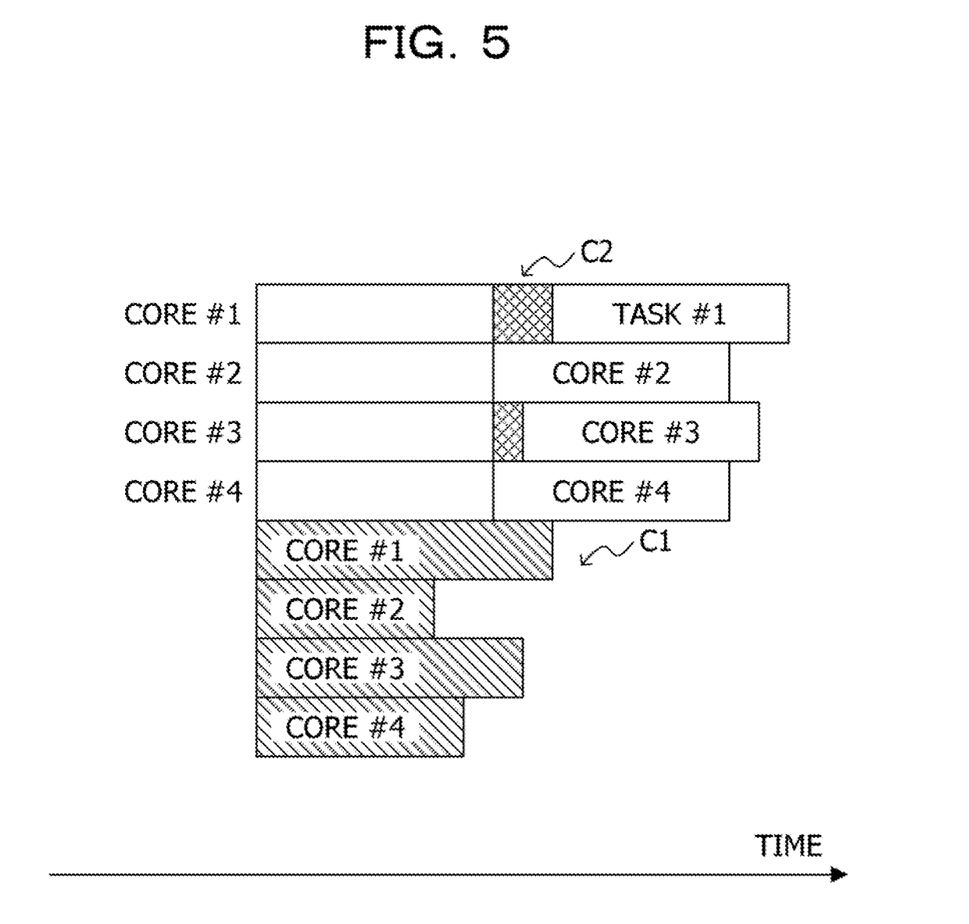
FIG. 5 is a graph illustrating a second example of a time series of task execution and prefetching in a related example.

FIG. 5 is a graph illustrating a second example of a time series of task execution and prefetching in a related example.

Since the load of the OSD differs for each partition set in a DRAM storage area, the time taken for prefetching also differs for each partition. For example, when a target OSD is already executing a prefetch request at the time when another prefetch request is issued, the prefetch request issued later is kept waiting, and accordingly the time to complete prefetching becomes longer.

This produces a task that does not complete prefetching before the task execution starts, and I/O wait occurs before the task starts processing the partition, which may increase the job execution time.

In the example illustrated in FIG. 5, since prefetching for the tasks #1 and #3 was not completed by the start of execution of a process in the cores (see reference sign C1), the I/O wait has occurred for the tasks #1 and #3 as indicated by the shaded portions (see reference sign C2).

Note that, actually, the reading of the partition from the DRAM of the OSD and the transfer to the DRAM of the executor are involved, but it is deemed that the time taken for these reading and transfer is sufficiently smaller than the time taken for I/O and data processes; thus these reading and transfer are not illustrated in FIG. 5.

Figure 6:
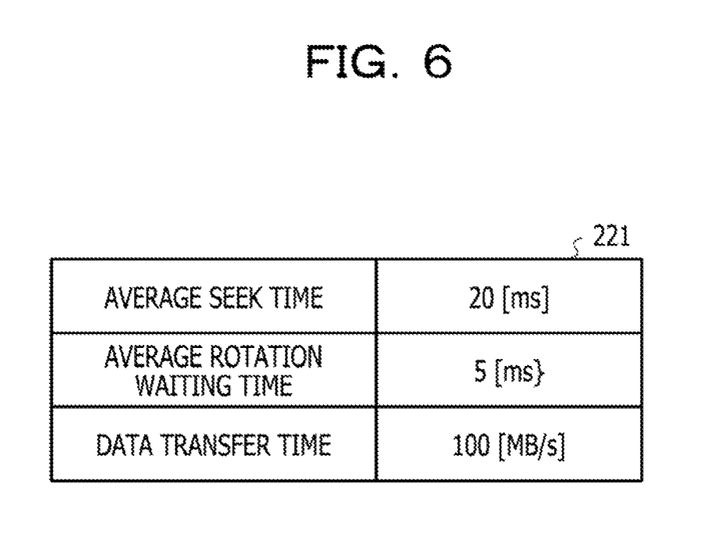
FIG. 6 is a table exemplifying performance characteristic information in the OSD illustrated in FIG. 1.

FIG. 6 is a table exemplifying the performance characteristic information 221 in the OSD 2 illustrated in FIG. 1.

The performance characteristic information 221 includes, for example, an average seek time, an average rotation waiting time, and a data transfer time in the HDD 23 of the OSD 2. The average seek time is the average time expected for a magnetic head of the HDD 23 to move to a track where the corresponding object is recorded. The average rotation waiting time is the average time expected until a position in the track where the corresponding object is recorded is rotated to reach the magnetic head. The data transfer time is the time expected to transfer data from the OSD 2 to the information processing device 1.

The task scheduler 11 assigns the next task based on the performance characteristic information 221 indicating the performance in an OSD 2 in which data related to the next task is recorded.

Figure 7:
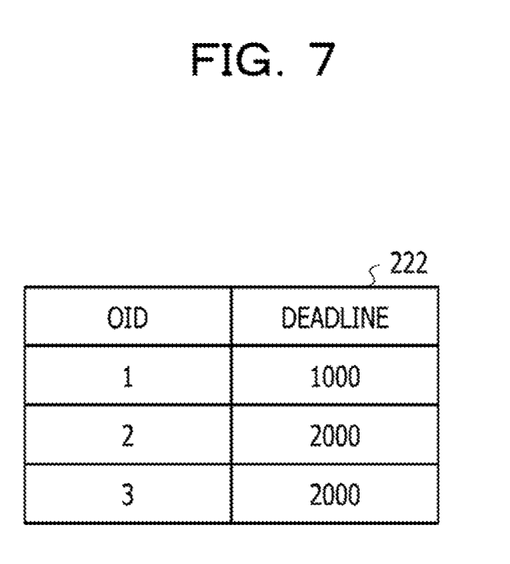
FIG. 7 is a table exemplifying deadline information in the OSD illustrated in FIG. 1.

FIG. 7 is a table exemplifying the deadline information 222 in the OSD 2 illustrated in FIG. 1.

In the deadline information, the deadline is associated with each object indicated by an object identifier PID).

Figure 8:
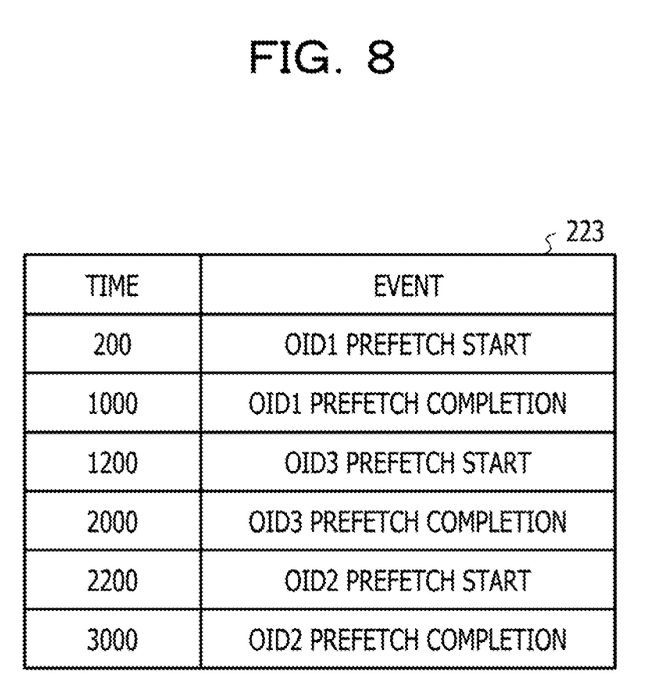
FIG. 8 is a table exemplifying an I/O schedule in the OSD illustrated in FIG. 1.

FIG. 8 is a table exemplifying the I/O schedule 223 in the OSD lustrated in FIG. 1.

An event at each time is registered in the I/O schedule 223. Examples of the event include prefetch start and prefetch completion for each OID.

Figure 9:
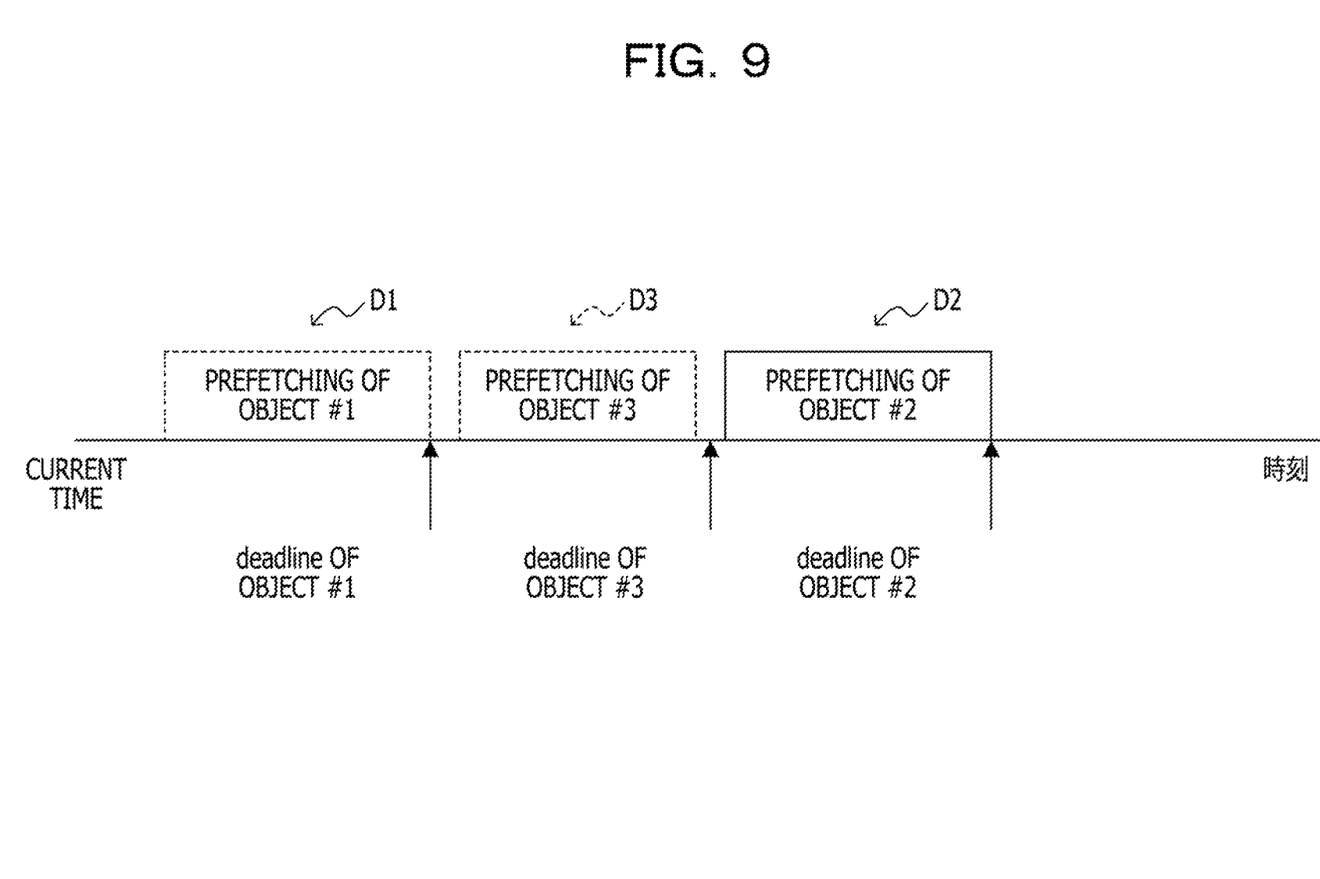
FIG. 9 is a graph illustrating a first example of a scheduling process in the storage system illustrated in FIG. 1.

FIG. 9 is a graph illustrating a first example of a scheduling process in the storage system 100 illustrated in FIG. 1.

In reserve, it is determined based on the size of the specified object and the performance characteristic information 221 whether or not prefetching of the specified object is to be completed by the specified deadline.

For example, when the current I/O schedule 223 is represented in FIG. 9, prefetching of objects #1 and #2 is currently scheduled (see reference signs D1 and D2).

It is assumed that reserve for a new object #3 is issued in this state. Whether or not this reserve succeeds depends on the size of the object #3, For example, when the size of the object #3 is small, prefetching can be performed at a timing between the objects #1 and #2 (see reference sign D3). In this case, reserve returns OK.

Figure 10:
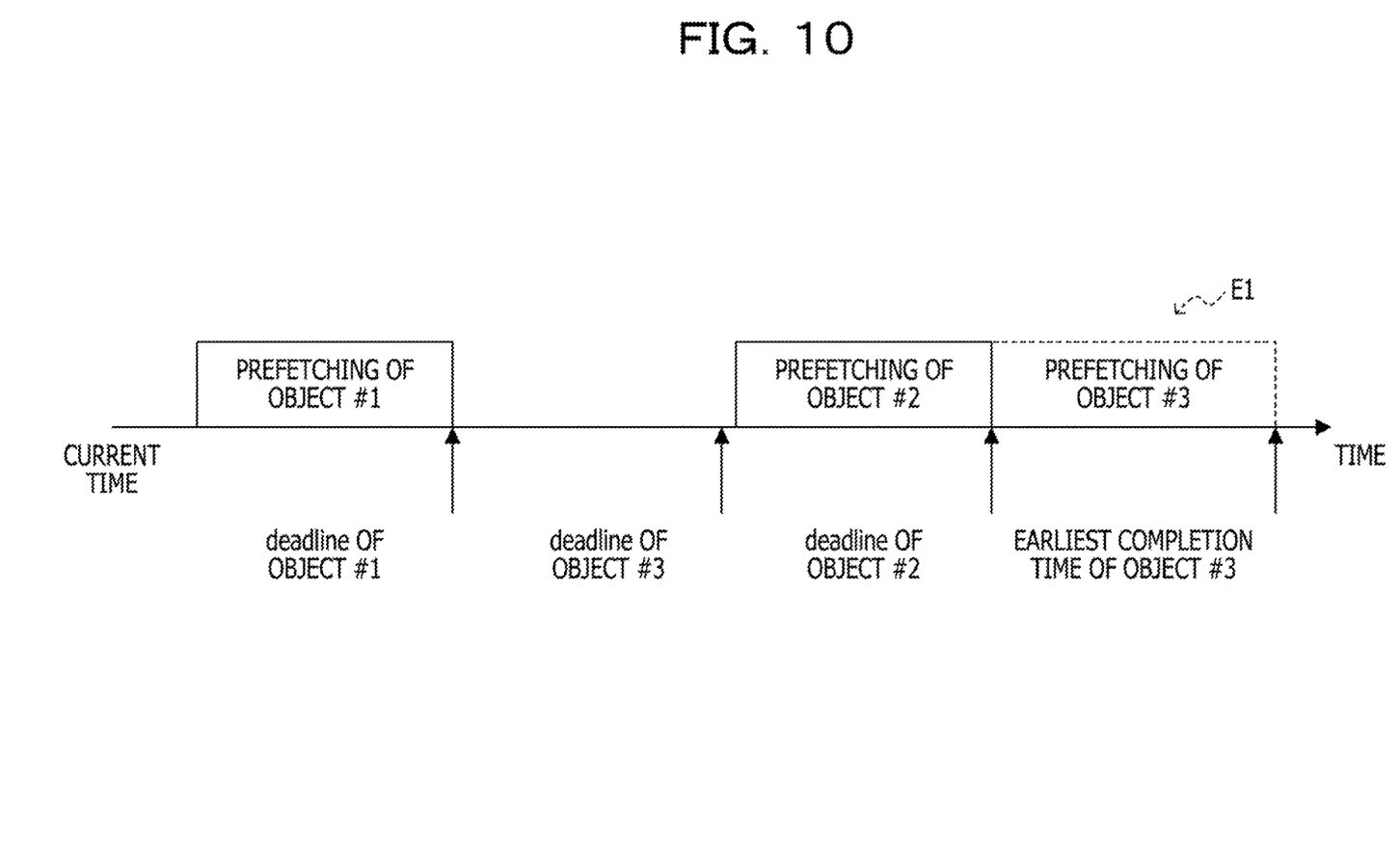
FIG. 10 is a graph illustrating a second example of the scheduling process in the storage system illustrated in FIG. 1.

FIG. 10 is a graph illustrating a second example of the scheduling process in the storage system 100 illustrated in FIG. 1.

As illustrated in FIG. 10, when the size of the object #3 is large, the object #3 has to be prefetched after the object #2, and the specified deadline may not be satisfied (see reference sign E1). In this case, reserve returns NG and the earliest completion time.

In both of the cases of FIGS. 9 and 10, the USD 2 tentatively schedules prefetching of the object #3, and reserve returns EAGAIN for other objects and fails until cancel or a prefetch request for the object #3 is received.

Note that, by changing the fixed I/O schedule 223 (in other words, by advancing prefetching of the object #1), it is feasible to perform optimization such that a new reserve succeeds.

Meanwhile, cancel deletes the tentative prefetch schedule for the specified object.

The prefetch request fixes the tentative prefetch schedule for the specified object.

[A-2] Operation Example

Figure 11:
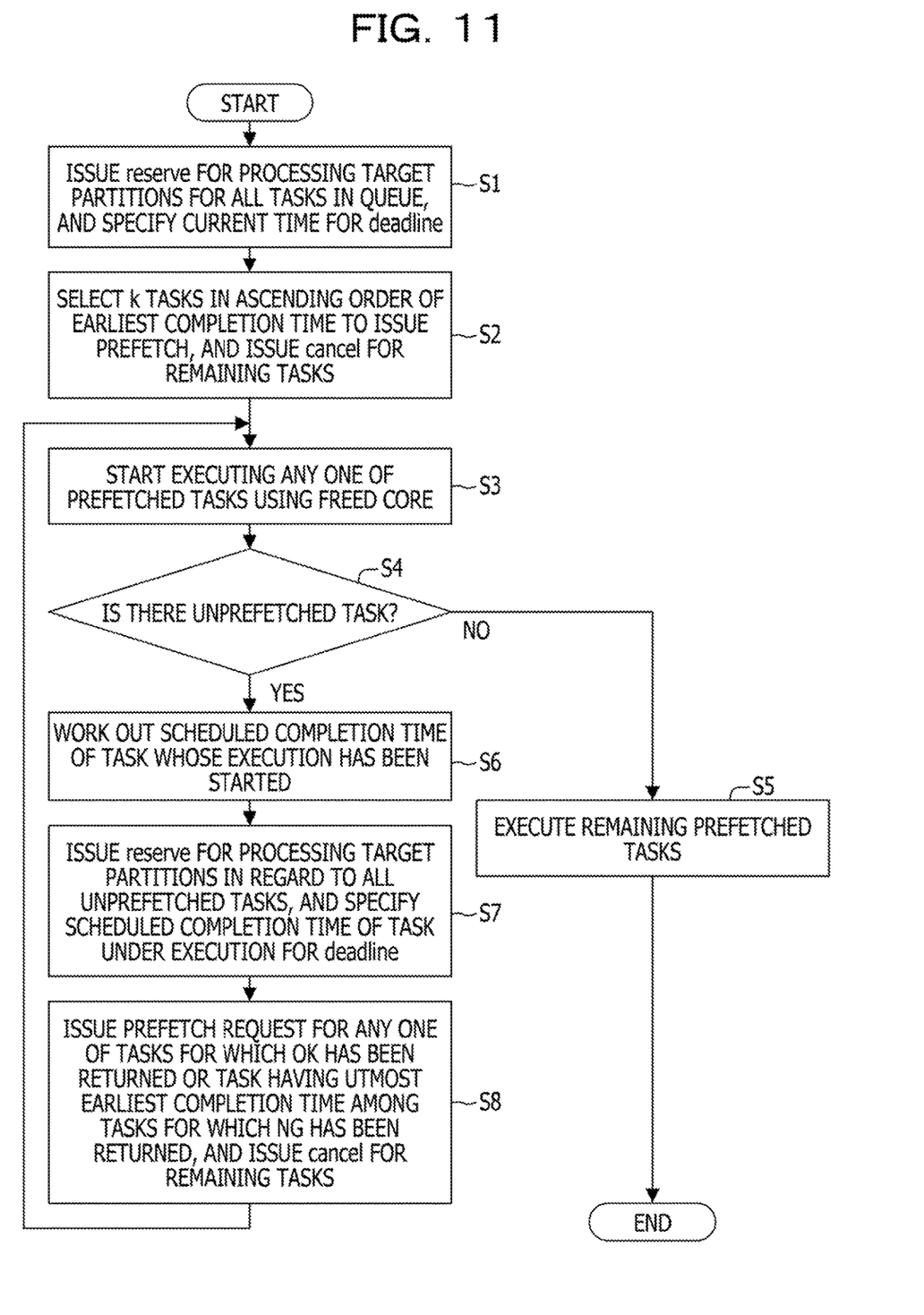
FIG. 11 is a flowchart explaining the scheduling process in the storage system illustrated in FIG. 1.

The scheduling process in the storage system 100 illustrated in FIG. 1 will be described according to the flowchart (steps S1 to S8) illustrated in FIG. 11.

The task scheduler 11 issues reserve for processing target partitions 141 for all tasks in the task queue 13, and specifies the current time for the deadline (step S1).

The task scheduler 11 selects k tasks in ascending order of the earliest completion time to issue prefetch, and issues cancel for the remaining tasks (step S2).

The task scheduler 11 starts executing any one of the prefetched tasks using the freed core 12 (step S3).

The task scheduler 11 determines whether there is an unprefetched task (step S4).

When there is no unprefetched task (see the No route in step S4), the task scheduler 11 executes the remaining prefetched tasks (step S5), and the scheduling process ends.

On the other hand, when there is an unprefetched task (see the Yes route in step S4), the task scheduler 11 works out the scheduled completion time of the task whose execution has been started (step S6).

The task scheduler 11 issues reserve for the processing target partitions 141 in regard to all unprefetched tasks, and specifies the scheduled completion time of the task under execution for the deadline (step S7).

The task scheduler 11 issues a prefetch request for any one of tasks for which OK has been returned or a task having the utmost earliest completion time among tasks for which NG has been returned, and issues cancel for the remaining tasks (step S8). Then, the process returns to step S3.

[A-3] Effects

Figure 12:
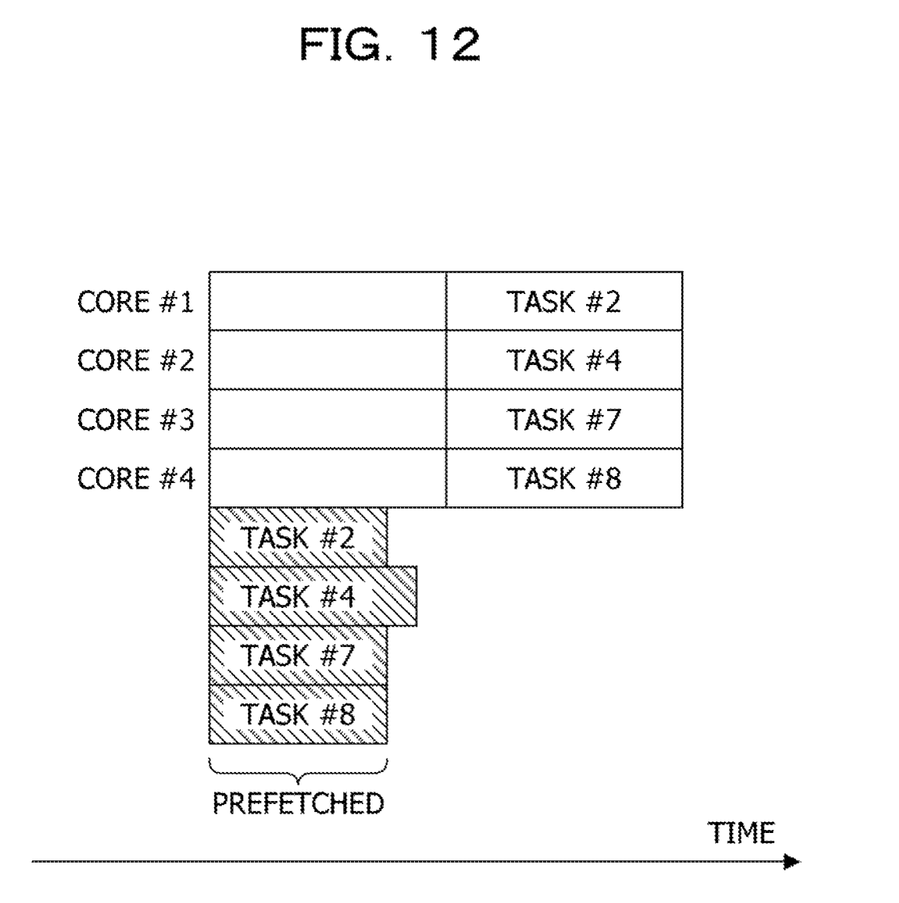
FIG. 12 is a graph explaining the effects of the scheduling process in the storage system illustrated in FIG. 1.

FIG. 12 is a graph explaining the effects of the scheduling process in the storage system 100 illustrated in FIG. 1.

The execution of tasks by the executor and prefetching by the storage cluster 20 represented by a time series are as illustrated in FIG. 12.

Compared to the related example illustrated in FIG. 5, tasks #7 and #8 in which partitions 141 for which reserve has returned OK are to be processed are scheduled instead of tasks #1 and #3 in which partitions 141 for which reserve has returned NG are to be processed. This may reduce the I/O wait time for tasks.

According to the information processing device 1, the storage system 100, and the scheduling program described above, the following effects may be obtained, for example.

The plurality of cores 12 processes a plurality of tasks related to a set of jobs. When designating the next task in the scheduling for the plurality of cores 12, the task scheduler 11 inquires of an assignment destination core 12 out of the plurality of cores 12 as to whether the next task is to be completed by the scheduled time. Then, the task scheduler 11 preferentially assigns a task supposed to be completed by the scheduled time in the assignment destination core 12, as the next task from among the plurality of tasks.

This may reduce the job execution time in the storage system 100.

The task scheduler 11 assigns the next task based on the performance characteristic information 221 indicating the performance in an OSD 2 in which data related to the next task is recorded.

Consequently, tasks may be assigned in consideration of access time to the OSD 2.

The task scheduler 11 performs prefetching for the next task on an OSD 2 in which data related to the next task is recorded, before assigning the next task.

Consequently, tasks ay be efficiently assigned when prefetching is performed.

The task scheduler 11 assigns the next task when the prefetching for the next task is to be completed by the scheduled time.

Consequently, whether prefetching is to be completed by the scheduled time may be reliably determined.

[B] Others

The disclosed technology is not limited to the above-described embodiments, and may be variously modified and carried out without departing from the spirit of the present embodiment. Each configuration and each process of the present embodiments may be selectively adopted or excluded according to need, or may be appropriately combined.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
 a communication interface configured to be coupled to a storage device storing a plurality of object data, each of the plurality of object data being a data set to be processed by a corresponding task of a plurality of tasks;
 a plurality of threads, each of the plurality of threads being configured to process any of a plurality of tasks, the plurality of tasks being obtained by dividing a job; and
 a control circuit configured to execute processing when designating a next task in scheduling for the plurality of threads, the processing including
  inquiring of the storage device as to whether prefetching of an object data for the next task is to be completed by a scheduled time,
  receiving, from the storage device, an answer with respect to the inquiring, and
  in response to the answer indicating that the prefetching of the object data for the next task is to be completed by the scheduled time, preferentially assigning the next task from among the plurality of tasks to any of the plurality of threads.

2. The information processing device according to claim 1, wherein the control circuit is configured to assign the next task based on information that indicates performance in a storage device in which data related to the next task is recorded.

3. The information processing device according to claim 1, wherein the control circuit is configured to perform prefetching for the next task on a storage device in which data related to the next task is recorded, before assigning the next task.

4. The information processing device according to claim 3, wherein the control circuit is configured to assign the next task when the prefetching for the next task is to be completed by the scheduled time.

5. A storage system comprising:
a storage device configured to store a plurality of object data, each of the plurality of object data being a data set to be processed by a corresponding task of a plurality of tasks;
a plurality of threads, each of the plurality of threads being configured to process any of the plurality of tasks; and
a control circuit configured to execute processing when designating a next task in scheduling for the plurality of threads, the processing including
inquiring of the storage device as to whether prefetching of an object data for the next task is to be completed by a scheduled time,
receiving, from the storage device, an answer with respect to the inquiring, and
in response to the answer indicating that the prefetching of the object data for the next task is to be completed by the scheduled time, preferentially assigning the next task from among the plurality of tasks to any of the plurality of threads.

6. A non-transitory computer-readable storage medium for storing a scheduling program which causes a processor to perform processing, the processing comprising:
storing, in a storage device, a plurality of object data each of which is a data set to be processed by a corresponding task of a plurality of tasks, each of the plurality of tasks being to be processed by any of a plurality of threads; and
inquiring, when designating a next task in scheduling for the plurality of threads, of the storage device as to whether prefetching of an object data for the next task is to be completed by a scheduled time;
receiving, from the storage device, an answer with respect to the inquiring; and
in response to the answer indicating that the prefetching of the object data for the next task is to be completed by the scheduled time, preferentially assigning the next task from among the plurality of tasks to any of the plurality of threads.

* * * * *